W. E. MARTIN.
MEANS FOR STEERING AND CONTROLLING MOTOR TRACTORS, MOTOR PLOWS, AND THE LIKE.
APPLICATION FILED MAY 28, 1918.

1,277,740.

Patented Sept. 3, 1918.
3 SHEETS—SHEET 1.

W. E. MARTIN.
MEANS FOR STEERING AND CONTROLLING MOTOR TRACTORS, MOTOR PLOWS, AND THE LIKE.
APPLICATION FILED MAY 28, 1918.

1,277,740.

Patented Sept. 3, 1918.
3 SHEETS—SHEET 3.

Inventor:
William Edward Martin

By [signature]
his Atty

UNITED STATES PATENT OFFICE.

WILLIAM E. MARTIN, OF STAMFORD, ENGLAND.

MEANS FOR STEERING AND CONTROLLING MOTOR-TRACTORS, MOTOR-PLOWS, AND THE LIKE.

1,277,740.　　　　　Specification of Letters Patent.　　Patented Sept. 3, 1918.

Application filed May 28, 1918.　Serial No. 237,086.

*To all whom it may concern:*

Be it known that I, WILLIAM EDWARD MARTIN, a subject of the King of Great Britain, residing at Stamford, in the county of Lincoln, England, have invented certain new and useful Improvements in Means for Steering and Controlling Motor-Tractors, Motor-Plows, and the like, of which the following is a specification:—

The invention relates to that type of tractor or motor plow or other like cultivating implement in which a driving pinion at each side of the machine may be separately clutched or unclutched for rapidly steering the machine.

In such machines a frame carrying a caster-wheel, plow or cultivating tool, is generally pivoted to the main frame, and the two frames are caused to move on the pivotal point with respect to each other for ordinary steering purposes, as described in the specification of my United States Patent No. 1,204,808, granted 14th November, 1916.

The object of the present invention is to provide a single lever for operating the two dog clutches for driving the pinions, which lever may also control another piece of mechanism such as the main motor clutch or the reversing lever. The controlling lever is mounted adjacent to the steering wheel and this latter operates in a novel manner to control the ordinary steering of the machine.

The invention is illustrated in the accompanying drawings, in which:—

Figure 1:
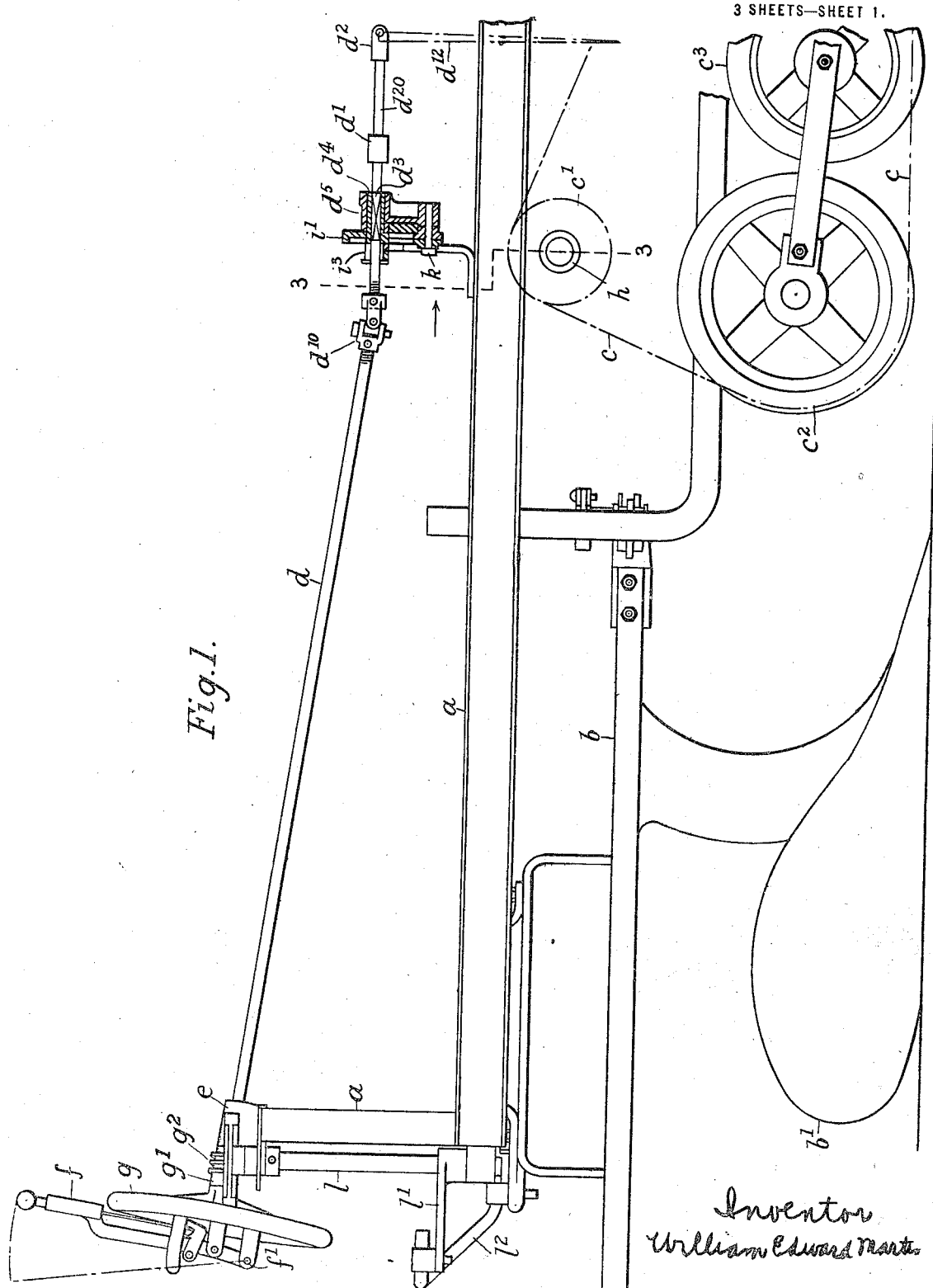
Figure 1 is a side elevation of part of a motor plow and Fig. 2 is a plan thereof.
Figure 2:
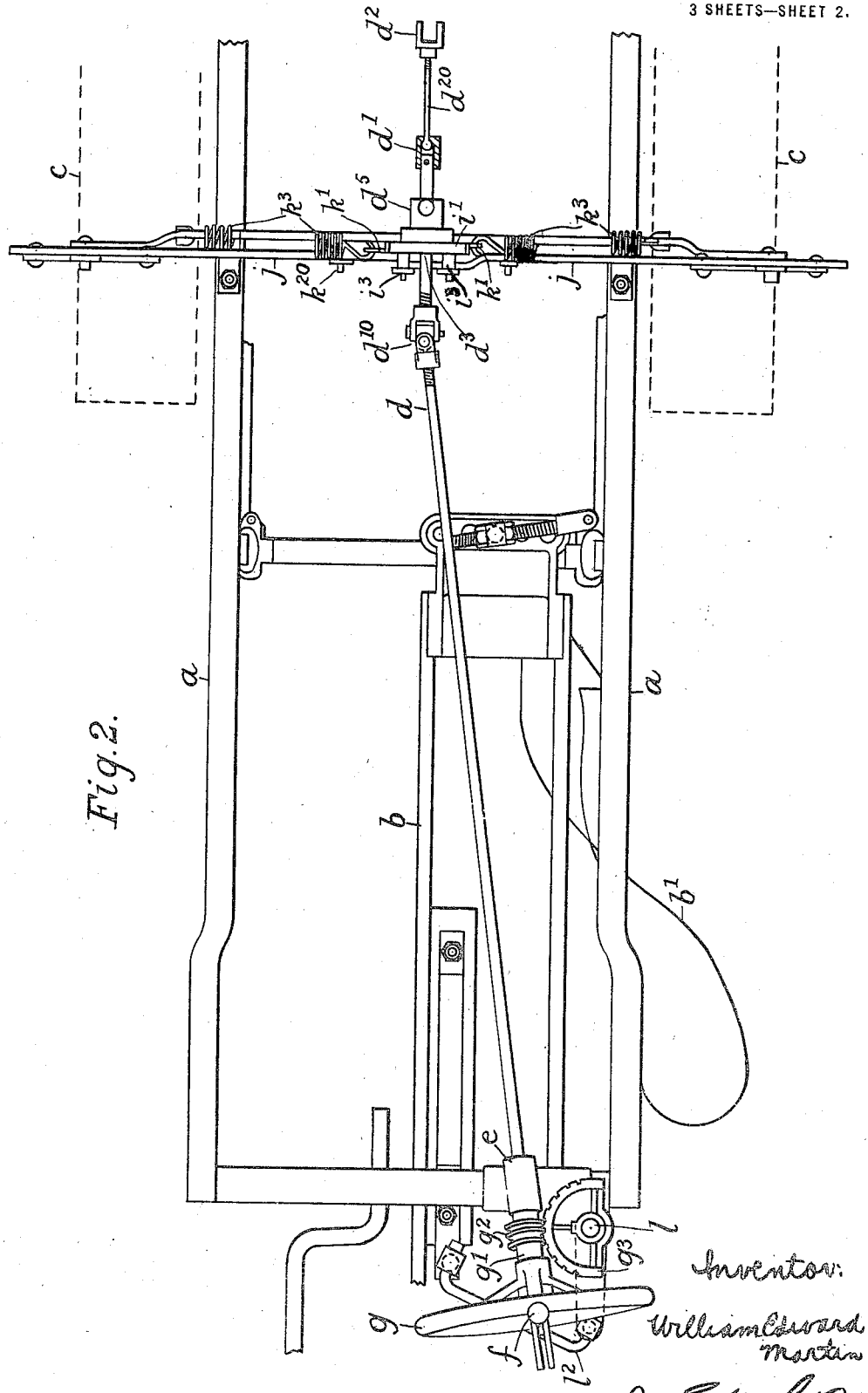
Figure 3:
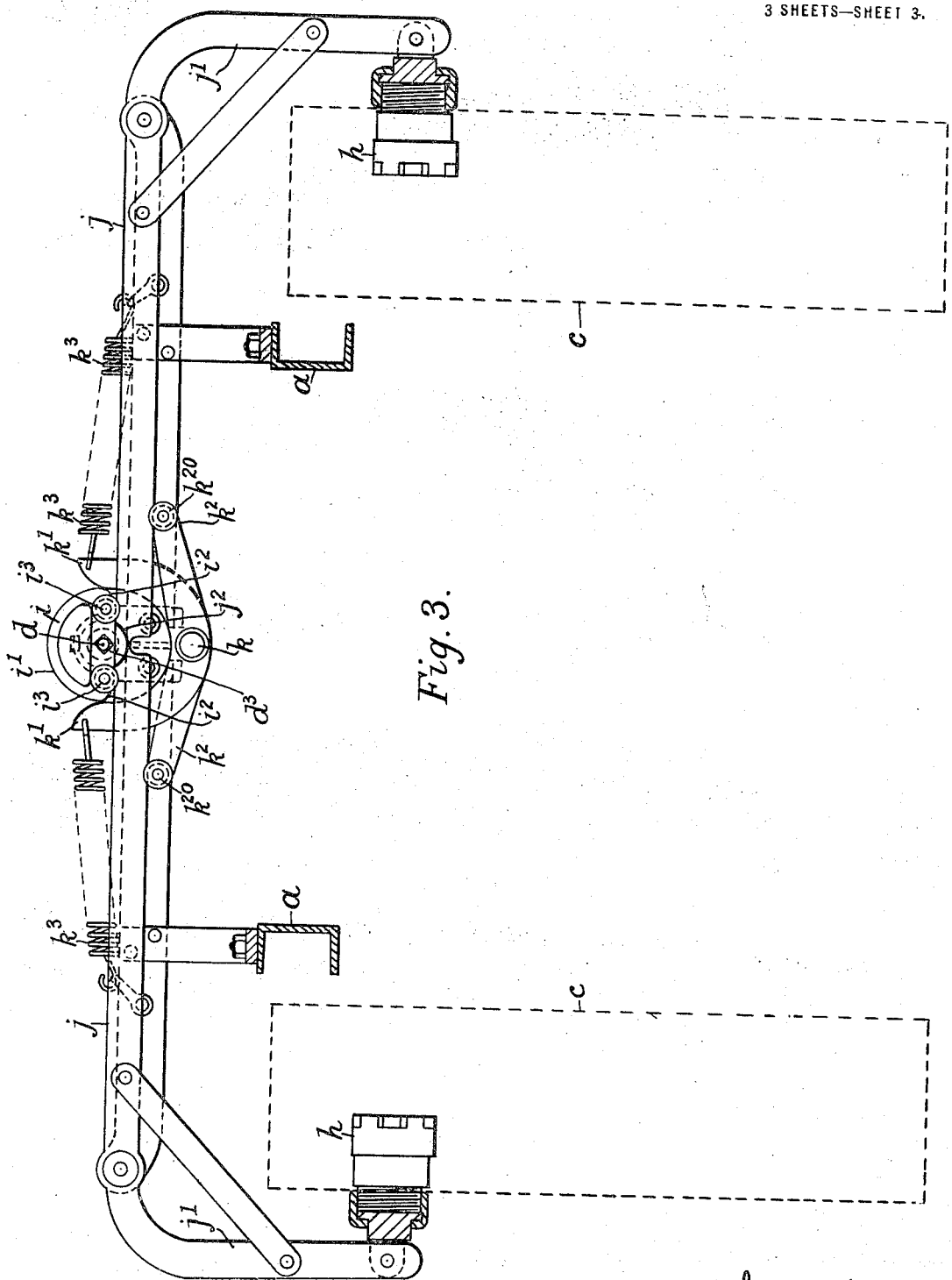
Fig. 3 is a cross section on the line 3—3 of Fig. 1 seen in the direction of the arrow.

$a$ is the main frame of the machine and $b$ is the smaller frame pivoted at its front end to the main frame. As shown in the drawings the smaller frame $b$ is supported by a plow breast $b'$, but this latter may be replaced by another supporting device such as another form of cultivating tool or by a caster wheel, which latter are not shown as they form no part of the invention.

$c\,c$ are the creeper chains shown diagrammatically, which are driven by the pinions $c'\,c'$ and pass around the supporting and guiding wheels $c^2\,c^3$ on each side of the machine.

According to the present invention a sliding rod $d$ passes through a fixed sleeve $e$, and the front end of the rod $d$ may be provided with a universal joint $d'$, which, by means of the rod $d^{20}$, is connected to some piece of mechanism at $d^2$, such as the main clutch lever or the reversing lever, represented by the broken lines $d^{12}$ in Fig. 1. This sliding rod $d$, at its rear-end, is pivoted to a lever $f$, the fulcrum $f'$ of which is preferably below the sliding rod $d$ as shown. The sliding rod $d$ and the said fulcrum $f'$ are mounted to rotate together, the former within the fixed sleeve $e$. The steering wheel $g$ carrying the fulcrum rotates independently of the sliding rod $d$. This latter can thus be pulled backward by means of the lever $f$ for operating another piece of mechanism such as the main motor clutch or the reversing gearing, or it may be rocked to the right or to the left at will. When rocked to either side it releases the dog clutch $h$ on that side and throws the driving mechanism on that side out of gear. The sliding rod $d$ is connected by a universal joint $d^{10}$ to a squared part $d^3$, which latter passes through a cam $i$. The squared part $d^3$ of the sliding rod $d$ is supported in a sleeve $d^4$ which has a square aperture passing through its center and which is cylindrical on its exterior. This sleeve $d^4$, which carries the said cam $i$, is mounted in a bearing $d^5$ in a fixed part of the main frame. The cam $i$ has a semi-circular part $i'$, concentric with the axis of the sliding part $d^3$ of the rod $d$, and two small cam surfaces $i^2$ at the ends of the semi-circular part $i'$. The cam $i$ has also two pins or projections $i^3$ standing out from one of its faces, which pins or projections are located near to the two said small cam surfaces $i^2$.

The dog clutches $h$ are each moved toward and away from the center line of the machine by bell-crank levers, each of which has a horizontal portion $j$ and a vertical portion $j'$, this latter operating the dog clutch $h$. The two horizontal portions $j\,j$ of these large bell-crank levers overlap each other at the center of the machine, where the adjacent ends are located side by side in two parallel planes. These adjacent ends are normally located beneath and pressed up against the pins or projections $i^3$ on the cam face and in that position the two dog clutches $h$ are in gear. The horizontal portions $j\,j$ of the large bell-crank levers are pressed upward by two smaller curved or bell-crank levers which are pivoted at $k$ directly below the axis of the cam $i$. These smaller levers have each an upwardly projecting portion $k'$ and a laterally projecting portion $k^2$. The two upwardly projecting portions $k'$ are normally in contact with the ends of the semi-circular portion $i'$ of the cam, and the laterally projecting portions $k^2$, or pins $k^{20}$ thereon, are normally pressing upward against the under surfaces of the horizontal parts $j$ of the large bell-crank levers. The upper end $k'$ of each small bell-crank lever has a spring $k^3$ attached thereto, which springs are in tension and act to press the laterally projecting portions $k^2$ upward against the under surfaces of the parts $j$ of the large bell-crank levers.

Such machines are subject to much vibration and the semi-circular part $i'$ of the cam $i$ prevents the upper ends $k'$ of the small bell-crank levers approaching each other and thus releasing the large bell-crank levers. It will be understood that if the upper ends $k'$ of these small bell-crank levers were not thus positively held apart, the vibration of the machine might overcome the springs $k^3$ which apply upward pressure to the horizontal portions $j$ of the large bell-crank levers.

Each of the ends of the horizontal portions $j$ of the large bell-crank levers is curved or formed with a cam surface at $j^2$ for the purpose hereinafter explained.

The action of the apparatus is as follows:—

If it be desired to turn the machine in a sharp curve to the right, it is necessary to release the right hand dog clutch $h$, and for this purpose the operating lever $f$ is moved to the right, thus rocking the cam $i$ over toward the right. The semi-circular part $i'$ of the cam $i$ immediately leaves the upper end $k'$ of the small bell-crank lever on its left; consequently, this upper end $k'$ is capable of moving toward the right, which action would release the right hand large bell-crank lever. The pin or projection $i^3$ on the right hand part of the cam $i$ depresses the end of the right hand large bell-crank lever and withdraws the right hand dog clutch $h$. This same pin or projection $i^3$ then passes under the curved or cam like end $j^2$ of the left large bell-crank lever and positively locks this lever in its upper position. The downward movement of the horizontal part $j$ of the right hand large bell-crank lever has depressed the end $k^2$ of its small bell-crank lever, the upper end $k'$ of which has moved to the right. When the controlling lever $f$ is moved back into its central vertical position, the cam $i$, in rotating, acts by the small cam surface $i^2$ on its left, to move the upper end $k'$ of the small bell-crank lever with which it comes into contact, toward the left so that the semi-circular part $i'$ of the cam $i$ may once more retain the upper ends of the two small bell-crank levers at the required distance apart to lock both the horizontal parts $j\ j$ of the large bell-crank levers in the upper positions and consequently lock the two dog clutches $h$ in driving position. When the controlling lever $f$ is moved to the left, the apparatus acts in a similar manner to that above described, the left pin or projection $i^3$ on the cam $i$ depressing the left large bell-crank lever and locking the right large bell-crank lever.

The sleeve $g'$, to which the steering wheel $g$ is fixed, has a worm $g^2$ thereon which meshes with part of a worm wheel $g^3$ fixed on the upper end of a vertical shaft $l$ mounted in suitable bearings carried by the main frame $a$. At its lower end this vertical shaft $l$ has a crank or lever $l'$, the outer end of which is connected by a link $l^2$ to the rear part of the smaller frame $b$ carrying the supporting device such as a caster wheel, plow breasts or other cultivating tools. When the vertical shaft $l$ is rocked by rotating the steering handle $g$, the main frame $a$ is moved laterally at its rear with respect to the smaller frame $b$, which is connected to the ground by the supporting device, and the machine is thus steered in manner well known but not so rapidly as when a clutch $h$ is liberated.

The lower or smaller frame $b$ is supported by the main frame $a$, and the two frames slide laterally with respect to each other in known manner, as described in my prior specification No. 1,204,808.

What I claim as my invention is:—

1. In means for steering and controlling motor tractors, motor plows and the like, the combination of a clutch on each side of the machine, a sliding and rotatable rod, means for moving said rod, a cam through which the rod slides and by which it is rotated, and means operated by said cam to lock the clutches each in its operative position when the cam is in its central position and to release either clutch according to which direction the cam is rotated, substantially as set forth.

2. In means for steering and controlling motor tractors, motor plows and the like, the combination of a clutch on each side of the machine, a large bell-crank lever controlling each clutch, a sliding and rotatable rod, means for moving said rod, a cam through which the rod slides and by which the cam is rotated, and two projections on said cam each of which, when the cam is rotated, first depresses one end of one large bell-crank lever to release the clutch and then passes under part of the other bell-crank lever to lock the same, substantially as set forth.

3. In means for steering and controlling motor tractors, motor plows and the like, the combination of a clutch on each side of the machine, a large bell-crank lever controlling each clutch, a sliding and rotatable rod, means for moving said rod, a cam through which the rod slides and by which the cam is rotated, two projections on said cam each of which, when the cam is rotated, first depresses one end of one large bell-crank lever to release the clutch and then passes under part of the other bell-crank lever to lock the same, and two spring-controlled small bell-crank levers each having a part which is held in contact with a large bell-crank lever and each having a part which is in contact with the surface of the cam, substantially as set forth.

4. In means for steering and controlling motor tractors, motor plows and the like, the combination of a clutch on each side of the machine, two large bell-crank levers each controlling a clutch and overlapping each other in parallel planes, a cam formed on the extreme end of each large bell-crank lever, a sliding and rotatable rod, means for moving said rod, a main cam through which the rod slides and by which the cam is rotated, two projections on said cam each of which, when the cam is rotated, first depresses one end of one large bell-crank lever to release the clutch and then passes under the cam on the extreme end of the other bell-crank lever to lock the same, and two small spring-controlled bell-crank levers pivoted directly below the sliding and rotatable rod, each small bell-crank lever having a part which is in contact with a large bell-crank lever and each having a part which is in contact with the surface of the main cam, substantially as set forth.

5. In means for steering and controlling motor tractors, motor plows and the like, the combination of a dog clutch on each side of the machine, a steering wheel, a sliding and rotatable rod passing through said steering wheel, a lever by which the rod is controlled, said lever, its fulcrum and rod rotating together, a cam through which the rod slides and by which it is rotated, and means operated by said cam to lock the dog clutches each in its operative position when the cam is in its central position and to release either clutch according to which direction the cam is rotated, substantially as set forth.

6. In means for steering and controlling motor tractors, motor plows and the like, the combination of a clutch on each side of the machine, a large bell-crank lever controlling each clutch, a sliding and rotatable rod, means for moving said rod, a cam through which the rod slides and by which the cam is rotated, said cam having a semi-circular part and two small cam surfaces at the end of the semi-circular part, two projections on said cam each of which, when the cam is rotated, first depresses one end of one large bell-crank lever to release the clutch and then passes under part of the other bell-crank lever to lock the same, and two spring-controlled small bell-crank levers each having a part which is held in contact with a large bell-crank lever and each having an upper part which is controlled by the surface of the cam, substantially as set forth.

7. In means for steering and controlling motor tractors, motor plows and the like, the combination of a main frame, a clutch on each side of the main frame, a steering wheel, a worm on the steering wheel, a vertical shaft, a worm wheel on said vertical shaft in gear with said worm, a smaller frame pivoted at its front end to the main frame, means operated by the vertical shaft for moving the smaller frame with relation to the main frame, a sliding and rotatable rod passing through said steering wheel, a lever by which the rod is controlled, said lever, its fulcrum and said rod rotating together, a cam through which the rod slides and by which it is rotated, and means operated by said cam to lock the clutches each in its operative position when the cam is in its central position and to release either clutch according to which direction the cam is rotated, substantially as set forth.

8. In means for steering and controlling motor tractors, motor plows and the like, the combination of a clutch on each side of the machine, a sliding and rotatable rod, means for moving said rod, a cam through which the rod slides and by which it is rotated, means operated by said cam to lock the clutches each in its operative position when the cam is in its central position and to release either clutch according to which direction the cam is rotated, and a universal joint at the front end of the sliding and rotatable rod connected to mechanism for controlling part of the motor, substantially as set forth.

In witness whereof I have hereunto set my hand.

WILLIAM E. MARTIN.